(12) United States Patent
Kang et al.

(10) Patent No.: US 8,054,044 B2
(45) Date of Patent: Nov. 8, 2011

(54) APPARATUS AND METHOD FOR BALANCING OF BATTERY CELL'S CHARGE CAPACITY

(75) Inventors: Ju-Hyun Kang, Daejeon (KR); Do-Youn Kim, Daejeon (KR); Sang-Hoon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 268 days.

(21) Appl. No.: 12/444,712

(22) PCT Filed: Jul. 28, 2008

(86) PCT No.: PCT/KR2008/004396
§ 371 (c)(1),
(2), (4) Date: Apr. 8, 2009

(87) PCT Pub. No.: WO2009/014407
PCT Pub. Date: Jan. 29, 2009

(65) Prior Publication Data

US 2010/0026241 A1 Feb. 4, 2010

(30) Foreign Application Priority Data

Jul. 26, 2007 (KR) ........................ 10-2007-0075140

(51) Int. Cl.
*H02J 7/00* (2006.01)

(52) U.S. Cl. ........ 320/118; 320/119; 320/122; 320/124; 324/434

(58) Field of Classification Search .................. 320/118, 320/119, 122, 124; 324/434
See application file for complete search history.

(56) References Cited

U.S. PATENT DOCUMENTS 6,081,095 A * 6/2000 Tamura et al. ................ 320/118
6,268,710 B1 * 7/2001 Koga ............................ 320/116
6,459,236 B2 10/2002 Kawashima
7,511,457 B2 3/2009 Emori et al.
2006/0103351 A1 * 5/2006 Tanigawa et al. ............. 320/118

FOREIGN PATENT DOCUMENTS

JP 6-253463 A 9/1994
JP 2001-178008 A 6/2001
JP 2005-318750 A 11/2005
KR 1997-0018902 A 4/1997
KR 10-0666817 B1 1/2007

* cited by examiner

*Primary Examiner* — Edward Tso
*Assistant Examiner* — Samuel Berhanu
(74) *Attorney, Agent, or Firm* — Birch, Stewart, Kolasch & Birch, LLP

(57) ABSTRACT

An apparatus for balancing charge capacity of battery cell includes a voltage sensing/discharging circuit having a battery with cell group, a switching unit for selectively connecting both terminals of each battery cell to conductive lines, capacitor connected to the conductive lines, a voltage amplifying unit connected to both terminals of capacitor via a first switch, and a discharge resistance connected to both terminals of capacitor via a second switch; and a voltage balancing unit for controlling the switching unit in ON state of first switch to connect both terminals of each battery cell to the conductive lines and then sense voltage of each battery cell through the voltage amplifying unit, and controlling the switching unit in OFF state of first switch to charge voltage of balancing-requiring cell to the capacitor and then turning on the second switch to discharge charged voltage of capacitor through the discharge resistance.

6 Claims, 3 Drawing Sheets

[Fig. 1]
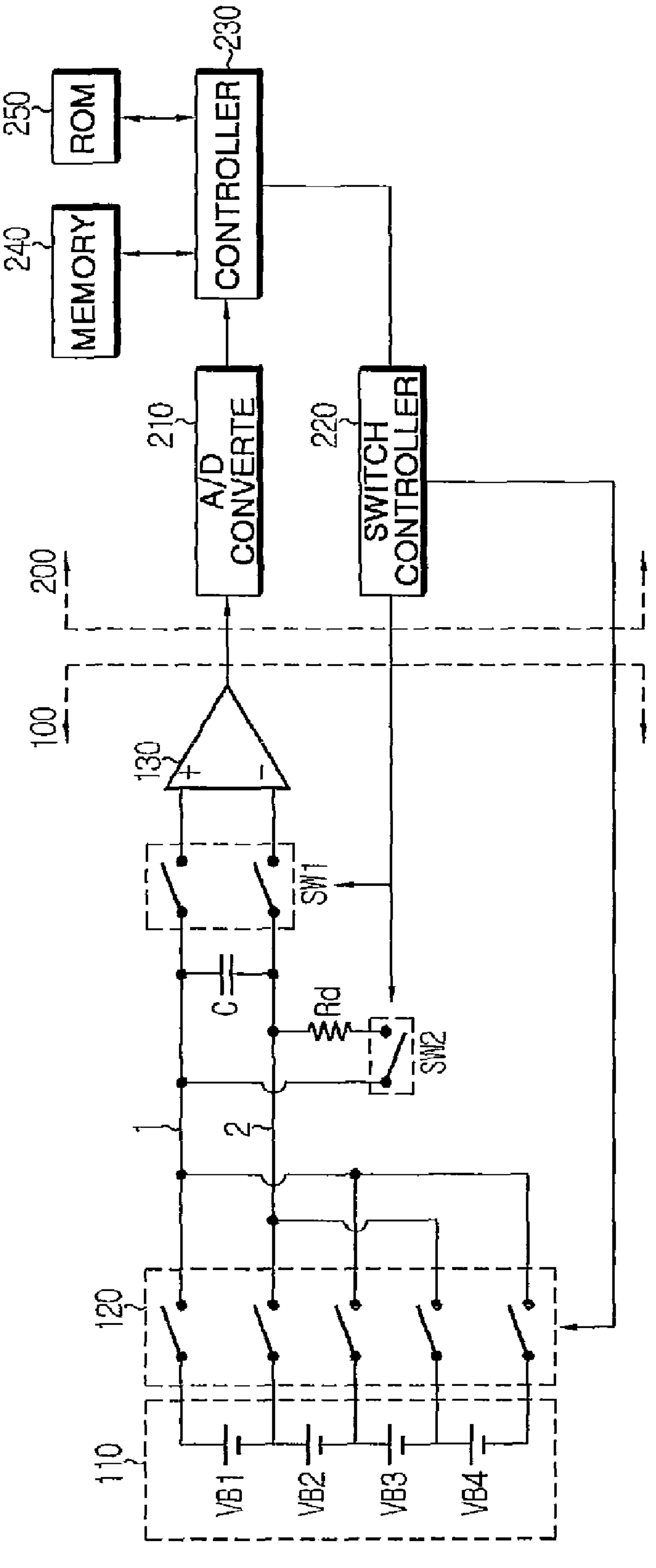

[Fig. 2]
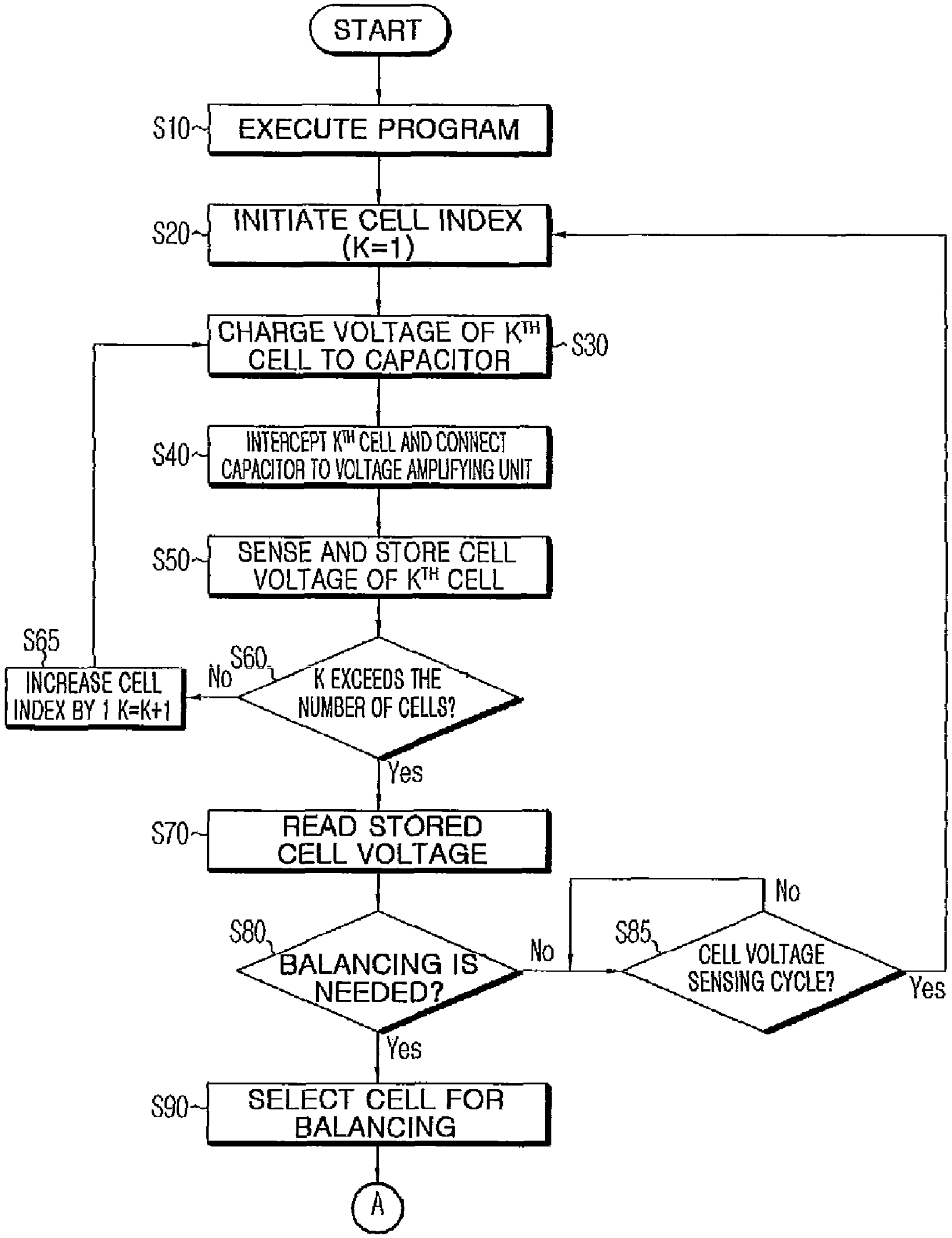

[Fig. 3]
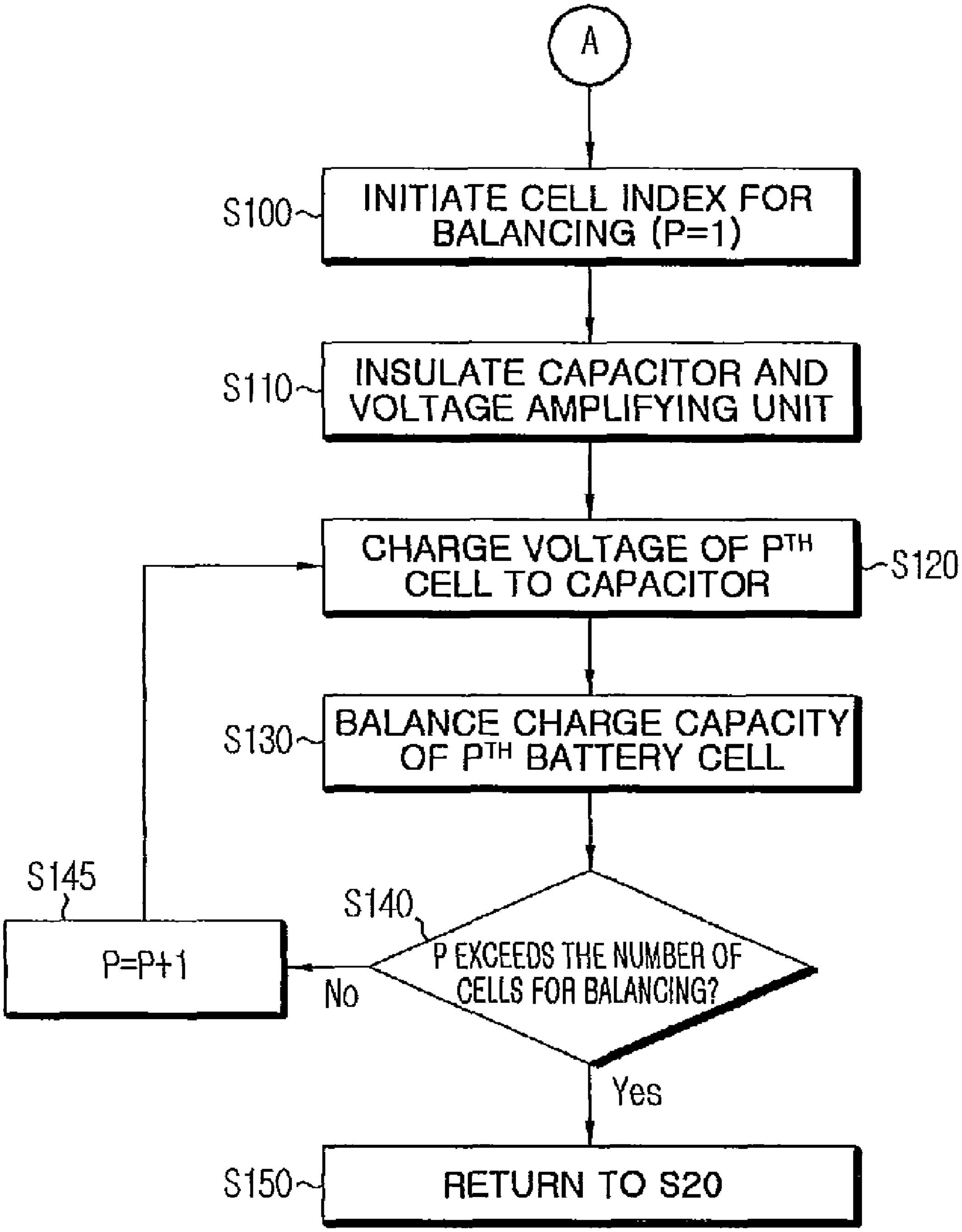

APPARATUS AND METHOD FOR BALANCING OF BATTERY CELL'S CHARGE CAPACITY

TECHNICAL FIELD

The present invention relates to apparatus and method for balancing charge capacity of a battery cell, and more particularly to apparatus and method for balancing charge capacity of a battery cell, which may balance charge capacity of each battery cell using a sensing circuit that senses voltage of each battery cell included in a battery.

BACKGROUND ART

Generally, secondary batteries include nickel-cadmium batteries, nickel-hydrogen batteries, lithium ion batteries and lithium ion polymer batteries. Such secondary batteries are classified into lithium based batteries and nickel-hydrogen based batteries. Lithium based batteries are mainly used for small products such as digital camera, P-DVD, MP3P, cellular phone, PDA, portable game device, power tool and E-bike, and nickel-hydrogen based batteries are mainly applied to and used for large products such as electric vehicle and hybrid electric vehicle, which need high output.

Meanwhile, for driving an electric vehicle or a hybrid electric vehicle, a motor should be operated, which requires high output. For this purpose, a battery employed in an electric vehicle or a hybrid electric vehicle uses electricity output from a group of plural unit cells connected in series or in parallel as its power source.

However, in case a plurality of unit cells are connected in a battery, there may be made differences among charge capacities of the unit cells after the unit cells are repeatedly charged and discharged. If charging/discharging is continued while such charge capacity different is left alone, some of unit cells may come into a overcharged or overdischarged state, which may disturb supplying stable power to a load (e.g., a motor).

To solve this problem, various circuits for continuously monitoring charge capacity of battery cells and then balancing the charge capacity of the battery cells to a constant level have been proposed and used to a battery management system.

For balancing charge capacities of battery cells, it is required to sense charge voltage of each battery cell. Conventionally, it was a common case that a circuit for sensing charge voltage of each battery cell and a circuit for balancing charge capacity of each battery cell are separately configured. However, if the charge voltage sensing circuit and the charge capacity balancing circuit are configured separately, each circuit should use a separate element individually, which causes various problems (e.g., increased cost, increased breakdown rate). Accordingly, there is an urgent need for a scheme to efficiently balance charge capacities of battery cells with a low cost using a simple circuit configuration.

DISCLOSURE OF INVENTION

Technical Problem

The present invention is designed to solve the problems of the prior art, and therefore it is an object of the present invention to provide apparatus and method for balancing charge capacity of a battery, which may sense charge voltage and balance charge capacity of each battery cell at the same time using a simple circuit configuration.

Technical Solution

In order to accomplish the above object, the present invention provides an apparatus for balancing charge capacity of a battery cell, comprising a voltage sensing and discharging circuit including a battery having a cell group, a switching unit for selectively connecting both terminals of each battery cell of the cell group to first and second conductive lines, a capacitor connected to the first and second conductive lines in parallel, a voltage amplifying unit connected to both terminals of the capacitor via a first switch, and a discharge resistance connected to both terminals of the capacitor in series via a second switch; and a voltage balancing unit for controlling the switching unit in an ON state of the first switch to connect both terminals of each battery cell of the cell group to the first and second conductive lines and then sense voltage of each battery cell through the voltage amplifying unit, and controlling the switching unit in an OFF state of the first switch to charge voltage of a cell requiring discharge for balancing of charge capacity to the capacitor and then turning on the second switch to discharge a charged voltage of the capacitor through the discharge resistance.

Preferably, the voltage balancing unit includes a A/D converter for converting an analog voltage signal output from the voltage amplifying unit into a digital voltage signal; a switch controller for selectively connecting both terminals of each battery cell of the cell group to the first and second conductive lines and controlling ON/OFF operation of the first and second switches; and a controller, wherein, in a cell voltage sensing mode, the controller controls the switch controller to sense voltage of each battery cell charged to the capacitor with the use of the voltage amplifying unit and the A/D converter, and wherein, in a charge capacity balancing mode, the controller controls the switch controller to charge voltage of a battery cell for balancing to the capacitor and then discharge a voltage of the capacitor through the discharge resistance, thereby controlling overall operations of the voltage balancing unit Preferably, in the cell voltage sensing mode, the switch controller subsequently connects both terminals of each battery cell to the first and second conductive lines in an ON state of the first switch according to a control signal of the controller, while, in the charge capacity balancing mode, the switch controller subsequently connects both terminals of a cell requiring balancing in an OFF state of the first switch and also, if voltage of the cell requiring balancing is charged to the capacitor, the switch controller turns on the second switch to discharge the charged voltage.

In another aspect of the present invention, there is also provided a method for balancing charge capacity of a battery cell using a voltage sensing and discharging circuit, which includes a battery having a cell group, a switching unit for selectively connecting both terminals of each battery cell of the cell group to first and second conductive lines, a capacitor connected to the first and second conductive lines in parallel, a voltage amplifying unit connected to both terminals of the capacitor via a first switch, and a discharge resistance connected to both terminals of the capacitor in series via a second switch, the method comprising (a) controlling the switching unit to connect both terminals of each battery cell of the cell group to the first and second conductive lines and then sense voltage of each battery cell, charged to the capacitor, through the voltage amplifying unit; (b) monitoring the sensed voltage of each battery cell to select a cell that requires balancing; and (c) controlling the switching unit to turn off the first switch, subsequently connect each selected battery cell to the first and second conductive lines for charging a cell voltage to a capacitor, and then turning on the second switch to discharge a cell voltage charged to the capacitor through the discharge resistance.

Preferably, the step (a) includes amplifying voltage of both terminals of the capacitor to generate an analog voltage signal; and converting the analog voltage signal into a digital voltage signal.

Preferably, in the step (b), voltages of the sensed battery cells are averaged, and then a cell having a voltage a predetermined limit higher than the average voltage level is selected as a cell for discharging.

As an alternative, in the step (b), a cell having a voltage over a predetermined limit based on a cell having a minimum voltage is selected as a cell for discharging.

Advantageous Effects

According to the present invention, an apparatus for balancing charge capacity of a battery cell using a simple circuit is provided to sense voltage and balance charge balance of each battery cell at the same time. Thus, the number of electronic elements is reduced in comparison to the convention case in which electronic elements were used separately for each part, thereby reducing a cost. In addition, since sensing of voltage and balancing of charge capacity of each battery cell may be conducted at the same time only using one simple circuit configuration, a breakdown rate of the battery balancing apparatus is greatly decreased, thereby allowing stable operation of the battery power system.

BRIEF DESCRIPTION OF THE DRAWINGS

FIG. 1 is a schematic circuit diagram showing an apparatus for balancing charge capacity of a battery cell according to a preferred embodiment of the present invention.

FIGS. 2 and 3 are flowcharts illustrating a method for balancing charge capacity of a battery cell according to a preferred embodiment of the present invention.

REFERENCE NUMERALS OF ESSENTIAL PARTS IN THE DRAWINGS

100: voltage sensing and discharging circuit
200: voltage balancing unit
110: battery 120: switching unit
130: voltage amplifying unit 210: A/D converter
220: switch controller 230: controller
240: memory 250: ROM

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

FIG. 1 is a schematic circuit diagram showing an apparatus for balancing charge capacity of a battery cell according to a preferred embodiment of the present invention.

Referring to FIG. 1, an apparatus for balancing charge capacity of a battery cell according to the present invention includes a voltage sensing and discharging circuit 100 and a voltage balancing unit 200.

The voltage sensing and discharging circuit 100 includes a switching unit 120 electrically connected to a battery 110 having a cell group and selectively connecting both terminals of each battery cell VB1, VB2, VB3, VB4 of the cell group to first and second conductive lines 1, 2, a capacitor C connected to the first and second conductive lines 1, 2 in parallel, a voltage amplifying unit 130 connected to both terminals of the capacitor C via a first switch SW1, and a discharge resistance $R_d$ connected to both terminals of the capacitor C in series via a second switch SW2.

The voltage balancing unit 200 selectively controls the switching unit 120 in an OFF state of the first and second switches SW1, SW2 to connect both terminals of each battery cell VB1, VB2, VB3, VB4 to the first and second conductive lines 1, 2 such that voltage of each battery cell VB1, VB2, VB3, VB4 is subsequently charged to the capacitor C. Also, if voltage is charged to the capacitor C, the voltage balancing unit 200 intercepts the switching unit 120 and turns on the first switch SW1 so as to sense voltage of each battery cell VB1, VB2, VB3, VB4 through the voltage amplifying unit 130.

In addition, while the first and second switches SW1, SW2 are turned off, the voltage balancing unit 200 controls the switching unit 120 to connect both terminals of a cell requiring charge capacity balancing to the first and second conductive lines 1, 2 such that the cell requiring charge capacity balancing is charged to the capacitor C. Also, if voltage is charged to the capacitor C, the voltage balancing unit 200 intercepts the switching unit 120 and turns on the second switch SW2 to discharge the charged voltage of the capacitor C through the discharge resistance $R_d$.

The voltage balancing unit 200 includes an A/D converter 210 for converting an analog voltage signal output from the voltage amplifying unit 130 into a digital voltage signal, a switch controller 220 for selectively connecting both terminals of each battery cell VB1, VB2, VB3, VB4 of the cell group to the first and second conductive lines 1, 2 and controlling ON/OFF operation of the first and second switches SW1, SW2, a controller 230 for sensing voltage of each battery cell VB1, VB2, VB3, VB4 and controlling overall operations for charge capacity balancing of each battery cell VB1, VB2, VB3, VB4, a memory 240 for storing a sensed voltage level of each battery cell VB1, VB2, VB3, VB4, and a ROM 250 storing a program for implementing the charge capacity balancing operation of a battery cell according to the present invention. Here, the memory 240 is an example of active memories, and the ROM 250 is an example of inactive memories. However, the present invention is not limited to the specific kinds of memories.

An operation mode of the apparatus for balancing charge capacity of a battery cell according to the present invention includes a cell voltage sensing mode for sensing voltage of each battery cell VB1, VB2, VB3, VB4, and a charge capacity balancing mode for balancing charge capacity of each battery cell VB1, VB2, VB3, VB4.

In the cell voltage sensing mode, a voltage of each battery cell VB1, VB2, VB3, VB4 included in the battery 110 is sensed. Voltages of the battery cells VB1, VB2, VB3, VB4 are sensed subsequently. First, in case a voltage of the first cell VB1 of the battery 110 is sensed, the first and second switches SW1, SW2 are turned off according to a control signal of the switch controller 220. Also, the switching unit 120 is controlled to connect both terminals of the first cell VB1 to the first and second conductive lines 1, 2. Then, a cell voltage output from the first cell VB1 is charged to the capacitor C. If the cell voltage is completely charged to the capacitor C, the switching unit 120 is controlled to disconnect the first cell VB1 from the first and second conductive lines 1, 2, and the first switch SW1 is turned on to sense the voltage of the first cell VB1 charged to the capacitor C through the voltage amplifying unit 130. If the voltage of the first cell VB1 is completely sensed, the first switch SW1 is turned off and the second switch SW2 is turned on to connect the capacitor C to the discharge resistance $R_d$ in series such that the voltage of the first cell VB1 charged to the capacitor C is discharged through the discharge resistance $R_d$, thereby resetting the capacitor C. Subsequently, the above voltage sensing operation is conducted to the other cells VB2, VB3, VB4 in the substantially same way to sense cell voltages thereof.

The analog voltage signal sensed through the voltage amplifying unit 130 is input to the A/D converter 210 and converted into a digital voltage signal, and then it is input to the controller 230. The controller 230 stores the digital voltage signal of each battery cell VB1, VB2, VB3, VB4 in the memory 240.

It would be apparent to those having ordinary skill in the art that the above operations for sensing voltage of each battery cell VB1, VB2, VB3, VB4 and storing the sensed voltage in the memory 240 is repeated at a certain cycle.

In the charge capacity balancing mode, the voltage value of each battery cell VB1, VB2, VB3, VB4, collected through the cell voltage sensing mode, is monitored and then the charge capacity of each battery cell VB1, VB2, VB3, VB4 is balanced to a constant level. For this purpose, the controller 230 reads a voltage value of each battery cell VB1, VB2, VB3, VB4, stored in the memory 240 in the cell voltage sensing mode, and then selects a cell that requires balancing. To select a cell requiring balancing, it is possible to average voltages of the battery cells VB1, VB2, VB3, VB4 and then select a cell having a voltage a predetermined limit higher than the average voltage level as a cell for balancing. As an alternative, a cell having a voltage over a predetermined limit based on a cell with a minimum voltage may be selected as a cell for balancing. In addition to the above two cases, a cell that requires balancing may be selected in various ways.

If a cell requiring balancing is selected through the above balancing cell selection process, the controller 230 discharges charge capacity of the cell through the discharge resistance $R_d$. Then, the charge capacity of each battery cell VB1, VB2, VB3, VB4 may be balanced to a constant level.

If the cell requiring balancing is assumed as a first cell VB1 of the battery 110, the controller 230 controls the switch controller 220 to turn off the first and second switches SW1, SW2. Also, the controller 230 controls the switching unit 120 to connect both terminals of the first cell VB1 to the first and second conductive lines 1, 2. Then, the cell voltage output from the first cell VB1 is charged to the capacitor C. After that, the controller 230 controls the switching unit 120 by means of the switch controller 220 to disconnect the first cell VB1 from the first and second conductive lines 1, 2, and turns on the second switch SW2 to discharge the voltage charged to the capacitor C, thereby balancing charge capacity of the first cell VB1. The controller 230 repeatedly conducts such a charge capacity balancing operation for each battery cell VB1, VB2, VB3, VB4, which requires charge capacity balancing, and as a result charge capacities of all battery cells VB1, VB2, VB3, VB4 of the battery 110 may be balanced.

FIGS. 2 and 3 are flowcharts illustrating a method for balancing charge capacity of a battery cell according to a preferred embodiment of the present invention.

First, in the step S10, the controller 230 executes a battery cell charge capacity balancing program stored in the ROM 250.

In the step S20, the controller 230 endows a cell index K to each battery cell VB1, VB2, VB3, VB4 so as to sense charge voltage of each battery cell VB1, VB2, VB3, VB4, and then initiates the value of cell index K into 1.

In the step S30, the controller 230 controls the switch controller 220 to turn off the first and second switches SW1, SW2 and connect both terminals of the $K^{th}$ battery cell (K is current 1) to the first and second conductive lines 1, 2. Accordingly, the voltage of the $K^{th}$ battery cell is charged to the capacitor C.

In the step S40, the controller 230 controls the switch controller 220 to intercept both terminals of the $K^{th}$ battery cell from the first and second conductive lines 1, 2 and turn on the first switch SW1 to connect the capacitor C to the voltage amplifying unit 130. Then, the voltage amplifying unit 130 amplifies the voltage at both ends of the capacitor C and outputs an amplified analog voltage signal to the A/D converter 210. Accordingly, the A/D converter 210 converts the analog voltage signal into a digital voltage signal.

In the step S50, the controller 230 receives the digital voltage signal from the A/D converter 210 to sense the charged voltage of the $K^{th}$ battery cell, and then stores the sensed voltage value of the $K^{th}$ battery cell into the memory 240. Subsequently, the controller 230 turns off the first switch SW1 and turns on the second switch SW2 to connect the capacitor C to the discharge resistance $R_d$ in series, thereby discharging the voltage charged to the capacitor C to reset the capacitor C.

In the step S60, the controller 230 determines whether the cell index K exceeds the number of total cells included in the battery 110.

The step S65 is executed when the cell index K does not exceed the number of total cells included in the battery 110, and at this step, the controller 230 returns the process to the step S30 while increasing the cell index K by 1. After that, the controller 230 repeatedly executes the steps S30 to S60 until the cell index K exceeds the number of total cells included in the battery 110, thereby sensing a charged voltage of each battery cell VB1, VB2, VB3, VB4 and storing the charged voltage into the memory 240.

The step S70 is executed when the cell index K exceeds the number of total cells included in the battery 110, and at this step, the controller 230 reads the voltage value of each battery cell VB1, VB2, VB3, VB4 stored in the memory 240.

In the step S80, the controller 230 determines whether it is required to balance the charge capacity of each battery cell VB1, VB2, VB3, VB4. The method for determining whether balancing is required for each battery cell is already explained above.

The step S85 is executed when it is determined that balancing charge capacity of each battery cell VB1, VB2, VB3, VB4 is not required, and at this step, the controller 230 determines whether a cell voltage sensing cycle comes, and then, if the cell voltage sensing cycle comes, the controller 230 returns the process to the step S20. After that, the controller 230 repeats the process for sensing a charged voltage of each battery cell VB1, VB2, VB3, VB4 and storing it into the memory 240.

The step S90 is executed when it is determined that balancing charge capacity of each battery cell VB1, VB2, VB3, VB4 is required, and at this step, the controller 230 selects a cell for balancing, which requires charge capacity balancing.

In the step S100, the controller 230 endows a cell index P to a cell for balancing, which requires charge capacity balancing, among the battery cells VB1, VB2, VB3, VB4, and initiates the cell index P into 1.

In the step S110, the controller 230 controls the switch controller 220 to turn off the first and second switches SW1, SW2, thereby isolating the capacitor C from the voltage amplifying unit 130.

In the step S120, the controller 230 controls the switching unit 120 to both terminals of a $P^{th}$ battery cell (P is currently 1) to the first and second conductive lines 1, 2. Accordingly, the charged voltage of the $P^{th}$ battery cell is charged to the capacitor C.

In the step S130, the controller 230 controls the switching unit 120 by means of the switch controller 220 to release the connection between the $P^{th}$ battery cell and the first and second conductive lines 1, 2 and turn on the second switch SW2 such that the voltage charged to the capacitor C is discharged through the discharge resistance $R_d$. Accordingly, the charge capacity of the $P^{th}$ battery cell is balanced.

In the step S140, the controller 230 determines whether the cell index P exceeds the number of total cells for balancing, which require charge capacity balancing.

The step S145 is executed when the cell index P does not exceed the number of total cells for balancing, which require balancing, and at this step, the controller 230 returns the process to the step S120 while increasing the cell index P by 1. Accordingly, the controller 230 repeatedly executes the steps S120 to S140 until the cell index P exceeds the number of total cells for balancing.

The step S150 is executed when the cell index P exceeds the number of total cells for balancing, which require balancing, and at this step, the controller 230 returns the process to the step S20. Thus, the controller 230 proceeds to a cell voltage sensing process of the next cycle.

It is apparent to those having ordinary skill in the art that the above steps S10 to S150 are repeatedly executed at regular cycles while the battery is used.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:

1. An apparatus for balancing charge capacity of a battery cell, comprising:

a voltage sensing and discharging circuit including a battery having a cell group, a switching unit for selectively connecting both terminals of each battery cell of the cell group to first and second conductive lines, a capacitor connected to the first and second conductive lines in parallel, a voltage amplifying unit connected to both terminals of the capacitor via a first switch, and a discharge resistance connected to both terminals of the capacitor in series via a second switch; and a voltage balancing unit for subsequently controlling the switching unit to connect both terminals of each battery cell of the cell group to the first and second conductive lines to charge the capacitor with a voltage of each battery cell, controlling the first switch to turn on to sense a charged voltage of the charged capacitor so that the voltage of each battery cell is sensed after disconnecting each battery cell from the first and second conductive lines, then selectively controlling the switching unit to connect both terminals of a battery cell that needs balancing of charge capacity to the first and second conductive lines to charge the capacitor with a voltage of the battery cell that needs balancing of charge capacity, and controlling the second switch to turn on to discharge the charged voltage of the corresponding capacitor by means of the discharge resistance after disconnecting the battery cell that needs balancing of charge capacity from the first and second conductive line so that the charge capacity of the battery is balanced, wherein the battery cell that needs balancing of charge capacity has a voltage a predetermined limit higher than a minimum voltage level.

2. The apparatus as claimed in claim 1, wherein the voltage balancing unit includes:

an A/D converter for converting an analog voltage signal output from the voltage amplifying unit into a digital voltage signal;

a switch controller for selectively connecting both terminals of each battery cell of the cell group to the first and second conductive lines and controlling ON/OFF operation of the first and second switches; and a controller, wherein, in a cell voltage sensing mode, the controller controls the switch controller to sense voltage of each battery cell charged to the capacitor with the use of the voltage amplifying unit and the A/D converter, and wherein, in a charge capacity balancing mode, the controller controls the switch controller to charge voltage of a battery cell for balancing to the capacitor and then discharge a voltage of the capacitor through the discharge resistance, thereby controlling overall operations of the voltage balancing unit.

3. The apparatus as claimed in claim 2, wherein, in the cell voltage sensing mode, the switch controller connects both terminals of each battery cell to the first and second conductive lines in an ON state of both first and second switches according to a control signal of the controller, and if the capacitor is charged with the voltage of each battery cell, the switch controller turns on the first switch to sense the voltage charged to the capacitor, and wherein, in the charge capacity balancing mode, the switch controller connects both terminals of a cell requiring balancing in an OFF state of both first and second switches and also, if voltage of the cell requiring balancing is charged to the capacitor, the switch controller turns on the second switch to discharge the charged voltage.

4. A method for balancing charge capacity of a battery cell using a voltage sensing and discharging circuit, which includes a battery having a cell group, a switching unit for selectively connecting both terminals of each battery cell of the cell group to first and second conductive lines, a capacitor connected to the first and second conductive lines in parallel, a voltage amplifying unit connected to both terminals of the capacitor via a first switch, and a discharge resistance connected to both terminals of the capacitor in series via a second switch, the method comprising:

(a) subsequently controlling the switching unit to connect both terminals of each battery cell of the cell group to the first and second conductive lines so that the capacitor is charged with a voltage of each battery cell, and then turning on the first switch to sense the voltage of each battery cell, charged to the capacitor, through the voltage amplifying unit after disconnecting each batter cell from the first and second conductive lines;

(b) monitoring the sensed voltage of each battery cell to select a cell that requires balancing; and (c) selectively controlling the switching unit to connect both terminals of the cell that needs balancing of charge capacity to the first and second conductive lines to charge the capacitor with a voltage of the cell that needs balancing of charge capacity, and then turning on the second switch to discharge the voltage charged to the capacitor through the discharge resistance after disconnecting the cell that needs balancing of charge capacity from the first and second conductive lines, wherein the cell that needs balancing of charge capacity has a voltage a predetermined limit higher than a minimum voltage level.

5. The method as claimed in claim 4, wherein the step (a) includes:

amplifying voltage of both terminals of the capacitor to generate an analog voltage signal; and converting the analog voltage signal into a digital voltage signal.

6. The method as claimed in claim 4, wherein, in the step (b), voltages of the sensed battery cells are averaged, and then a cell having a voltage a predetermined limit higher than the average voltage level is selected as a cell for discharging.

* * * * *